(12) United States Patent
Durling

(10) Patent No.: US 9,829,047 B2
(45) Date of Patent: Nov. 28, 2017

(54) SHAFT CLAMP ASSEMBLY AND A METHOD OF USING THE SAME

(71) Applicant: ROLLS-ROYCE PLC, London (GB)

(72) Inventor: Christopher John Durling, Bristol (GB)

(73) Assignee: ROLLS-ROYCE PLC, London (GB)

(*) Notice: Subject to any disclaimer, the term of this patent is extended or adjusted under 35 U.S.C. 154(b) by 520 days.

(21) Appl. No.: 14/633,660

(22) Filed: Feb. 27, 2015

(65) Prior Publication Data
US 2015/0275978 A1 Oct. 1, 2015

(30) Foreign Application Priority Data
Mar. 26, 2014 (GB) .................................. 1405378.9

(51) Int. Cl.
*F16B 39/10* (2006.01)
*F16B 7/04* (2006.01)
(Continued)

(52) U.S. Cl.
CPC ............... *F16D 1/06* (2013.01); *F01D 5/025* (2013.01); *F02C 7/06* (2013.01); *F04D 29/266* (2013.01);
(Continued)

(58) Field of Classification Search
CPC .......... B60B 27/0005; Y10T 403/7069; Y10T 29/49947; Y10T 29/49948;
(Continued)

(56) References Cited

U.S. PATENT DOCUMENTS

| | | |
|---|---|---|
| 1,257,022 A * | 2/1918 | Pittman ................... F16B 39/08 411/197 |
| 3,447,403 A | 6/1969 | Vogel, Sr. et al. |

(Continued)

FOREIGN PATENT DOCUMENTS

| | | |
|---|---|---|
| EP | 0 359 659 A1 | 3/1990 |
| EP | 2 267 290 A2 | 12/2010 |
| EP | 2 559 907 A1 | 2/2013 |

OTHER PUBLICATIONS

Jul. 31, 2014 Search Report issued in British Patent Application No. GB1405378.9.
(Continued)

*Primary Examiner* — Sarang Afzali
*Assistant Examiner* — Darrell C Ford
(74) *Attorney, Agent, or Firm* — Oliff PLC

(57) ABSTRACT

A shaft clamp assembly has first, second and third members. Each member has respective first and opposite second ends, and an annular body extending between the ends. The second member has a radially outwardly extending flange at its first end, and a radially inwardly extending flange at its second end. The third member also has a radially inwardly extending flange at its second end. The first, second and third members are disposed concentrically in sequence, with a threaded portion of the first member being threadingly engaged with a corresponding threaded surface on the shaft, the second end of the first member presses against the second end flange of the second member, the first end flange of the second member presses against the first end of the third member and the second end flange of the third member presses against the object to thereby secure the object to the shaft.

14 Claims, 5 Drawing Sheets

(51) Int. Cl.
*F16D 1/00* (2006.01)
*B23P 11/00* (2006.01)
*F16D 1/06* (2006.01)
*F01D 5/02* (2006.01)
*F04D 29/26* (2006.01)
*F16C 35/063* (2006.01)
*F02C 7/06* (2006.01)
*B25G 3/20* (2006.01)
*B21D 53/10* (2006.01)
*F16C 19/06* (2006.01)

(52) U.S. Cl.
CPC ............ *F16C 35/063* (2013.01); *F16C 19/06* (2013.01); *F16C 2240/06* (2013.01); *F16C 2360/23* (2013.01); *Y10T 29/49959* (2015.01); *Y10T 403/7069* (2015.01)

(58) Field of Classification Search
CPC ......... Y10T 29/49959; Y10T 29/49696; Y10T 29/497; B29C 65/56; F16B 7/182; F16B 13/06; F16B 13/08; F16B 17/00; F16B 21/02; F16B 2/02; F16D 1/076; F16C 33/00
USPC ............ 403/353, 374.4; 464/178; 29/525.01, 29/525.02, 525.08, 898.07, 898.09
See application file for complete search history.

(56) References Cited

U.S. PATENT DOCUMENTS

| | | | | |
|---|---|---|---|---|
| 4,553,614 A | * | 11/1985 | Jurgens | .................... E21B 17/07 175/302 |
| 5,069,587 A | * | 12/1991 | Levenstein | ............... F16D 1/06 29/456 |
| 6,244,405 B1 | * | 6/2001 | Chen | .................... B60B 27/0005 192/64 |
| 2004/0149951 A1 | * | 8/2004 | Gethmann | ............... F16K 31/44 251/291 |
| 2007/0215032 A1 | * | 9/2007 | Melberg | .................... G01K 5/62 116/218 |
| 2008/0144986 A1 | * | 6/2008 | Wajda | .................... F16C 35/073 384/538 |
| 2008/0279623 A1 | * | 11/2008 | McGlasson | ............. B23B 31/26 403/374.4 |
| 2010/0119185 A1 | * | 5/2010 | Fischer | ............... B60B 27/0005 384/517 |
| 2010/0202823 A1 | * | 8/2010 | Dizdarevic | ............. F16D 1/094 403/16 |
| 2010/0329776 A1 | * | 12/2010 | Durling | .................... F02C 7/36 403/342 |

OTHER PUBLICATIONS

Aug. 20, 2015 Search Report issued in European Patent Application No. 15 15 6758.

\* cited by examiner

SHAFT CLAMP ASSEMBLY AND A METHOD OF USING THE SAME

FIELD OF THE INVENTION

The present invention relates to a shaft clamp assembly for securing a component to a shaft and particularly, but not exclusively, to a shaft clamp assembly for securing a component to a shaft of a gas turbine engine.

BACKGROUND TO THE INVENTION

The use of a clamping nut to secure a component onto a shaft is common practice in many engineering applications (see FIG. 1). The action of tightening the clamping nut onto the shaft to create a clamping force causes an extension of the shaft with the consequential generation of strain in the shaft.

In space-critical situations it is often necessary to use a short nut to secure a short component, such as a bearing hub, onto a shaft. In such a situation, the amount of extension required in the shaft to produce a given clamping force against the component will necessarily be very small (typically in the region of approximately 0.1 mm to 0.2 mm). This requires precise control of the angular rotation of the clamping nut during the tightening process in order to achieve this level of extension.

A consequence of this level of required shaft extension is that an error of only approximately 0.02 mm in the extension of the shaft can lead to variations in the clamping force of up to approximately 20%, which variation may be technically unacceptable.

One approach to making the tightening of the bolted joint less sensitive to variation in angular rotation of the clamping nut is to increase the overall length of the clamped component stack by, for example, inserting a spacer between the clamping nut and the clamped component. However this approach may not always be possible if the additional length cannot be accommodated in the space available.

STATEMENTS OF INVENTION

According to a first aspect of the present invention there is provided a shaft clamp assembly for clamping an object onto a shaft, the shaft clamp assembly comprising:
- a first member formed from a first material, the first member having a first end, an opposite second end, and an annular body extending between the first end and the second end, the annular body having a threaded portion on a radially inner surface thereof;
- a second member formed from a second material, the second member having a first end, an opposite second end, and an annular body extending between the first end and the second end, the first end comprising a radially outwardly extending flange, the second end comprising a radially inwardly extending flange; and
- a third member formed from a third material, the third member having a first end, an opposite second end, and an annular body extending between the first end and the second end, the second end comprising a radially inwardly extending flange;
wherein, in use, the first member, second member and third member are disposed concentrically in sequence, the threaded portion of the first member is threadingly engaged with a corresponding threaded surface on the shaft, the second end of the first member presses against the radially inwardly extending flange at the second end of the second member, the radially outwardly extending flange at the first end of the second member presses against the first end of the third member and the radially inwardly extending flange at the second end of the third member presses against the object to thereby secure the object to the shaft.

By arranging the first member, second member and third member concentrically in sequence, the shaft clamp assembly can be provided with an effective length that is greater than its installed or axial length.

This enables the level of extension of the shaft clamp assembly to be increased without a concomitant increase in installed or axial length. This in turn makes the shaft clamp assembly of the invention less sensitive to variation in angular rotation of a corresponding clamping nut, and so more easily installed by a user.

Optionally, the annular body of the third member comprises an aperture adjacent to the second end of the third member, the aperture extending circumferentially around a part of the annular body.

The aperture is positioned radially outboard of the gap between the second end of the second member and the second end of the third member. In this way, a measuring gauge may be inserted through the aperture and into the gap.

The size of the gap correlates to the level of clamping force developed in the shaft clamp assembly. Accordingly a GO/NO-GO gauge may be used to check that the gap is within a predetermined range, which predetermined range corresponds to the required clamping force.

Alternatively, feeler gauges may be used to measure the gap with this measurement being used in conjunction with a reference chart to provide a measure of the clamping force in the shaft clamp assembly.

Optionally, the second material has a greater or smaller coefficient of thermal expansion than the first material.

This enables the clamping force generated by the shaft clamp assembly to be optimised for a particular operating temperature. This in turn makes the shaft clamp assembly more convenient for use in specific temperature environments.

Optionally, the third material has a greater or smaller coefficient of thermal expansion than the first material.

This enables the clamping force generated by the shaft clamp assembly to be optimised for a particular operating temperature or transient operating condition. This in turn makes the shaft clamp assembly more convenient for use in specific engine operating environments.

Optionally, the second end of the second member comprises a lug, the lug extending radially inwardly of the radially inwardly extending flange at the second end of the second member,
  wherein, in use, the lug is accommodated within a corresponding axial slot in the shaft.

This prevents relative rotation between the second member and the shaft, and ensures that rotational movement is restricted to the interface between the first member and the second member. This in turn ensures that the third member does not rotate against the face of the clamped member thereby protecting it from galling. This makes the shaft clamp assembly easier to adjust and so more convenient for a user.

Optionally, the shaft clamp assembly further comprises a deformable annular sleeve, the sleeve being accommodated between a radially outer surface of the annular body of the first member and a corresponding radially inner surface of the annular body of the second member and the first end of the first member comprises an annular array of castellations, wherein, in use, a first end of the sleeve is engageable with the castellations at the first end of the first member, and an opposite second end of the sleeve is engageable with the axial slot in the shaft, to prevent rotation of the shaft clamp relative to the shaft.

The annular array of castellations can be readily engaged by a corresponding castellated tightening tool. This makes the use of shaft clamp assembly easy and convenient for a user.

The need for a particular tightening tool having castellations that correspond to the annular array of castellations on the first member provides a measure of 'anti-tamper' protection to the shaft clamp assembly.

Optionally, the second material has a greater or smaller modulus of elasticity than the first material.

This requires a larger change in angular rotation of the first member in order for a particular clamping force to be achieved by the shaft clamp assembly. This in turn makes the adjustment of the first member to produce a predetermined clamping force easier and more convenient for a user.

Optionally, the third material has a greater or smaller modulus of elasticity than the first material.

This requires a larger change in angular rotation of the first member in order for a particular clamping force to be achieved by the shaft clamp assembly. This in turn makes the adjustment of the first member to produce a predetermined clamping force easier and more convenient for a user.

According to a second aspect of the present invention there is provided a method of clamping an object onto a shaft using a shaft clamp assembly according to the invention, the method comprising the steps of:
  positioning the object on the shaft;
  positioning the third, member on the shaft with the radially inwardly extending flange at the second end of the third member abutting the object;
  positioning the second member on the shaft and concentrically within the third member with the radially outwardly extending flange at the first end of the second member abutting the first end of the third member;
  positioning the first member on the shaft and concentrically within the second member, and threadingly engaging the threaded portion of the first member with the threaded surface of the shaft such that the second end of the first member abuts against the radially inwardly extending flange at the second end of the second member; and
  tightening the first member onto the shaft to clamp the object onto the shaft.

The concentric and sequential arrangement of the first member, second member and third member results in a shaft clamp assembly that is simple and easy to assemble and use.

Optionally, the annular body of the third member comprises an aperture adjacent to the second end of the third member, the aperture extending circumferentially around part of the annular body, the step of tightening the first member onto the shaft to clamp the object onto the shaft comprises the step of:
  measuring a clearance between the second end of the second member and the second end of the third member through the aperture; and
  tightening the first member onto the shaft until the clearance is within a predetermined range, to clamp the object onto the shaft with a corresponding predetermined torque.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
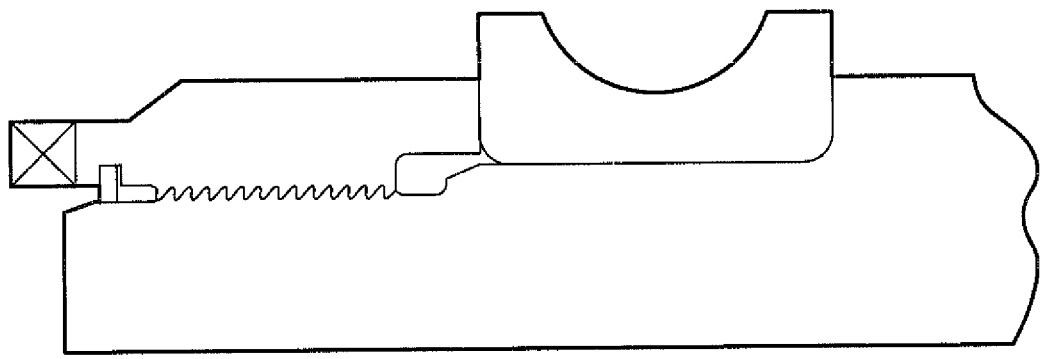
FIG. 1 shows a partial sectional view of a shaft clamp assembly according to the prior art.
Figure 2:
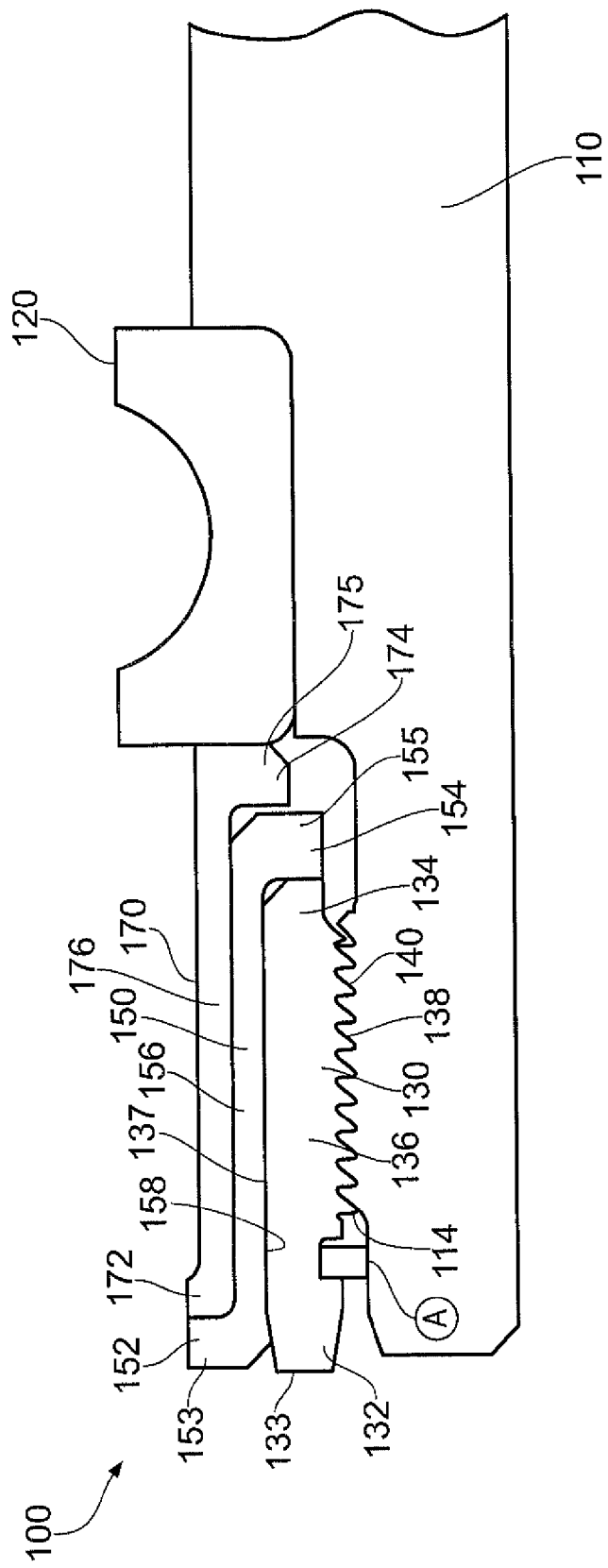
FIG. 2 shows a partial sectional view of a shaft clamp assembly according to a first embodiment of the invention.
Figure 3:
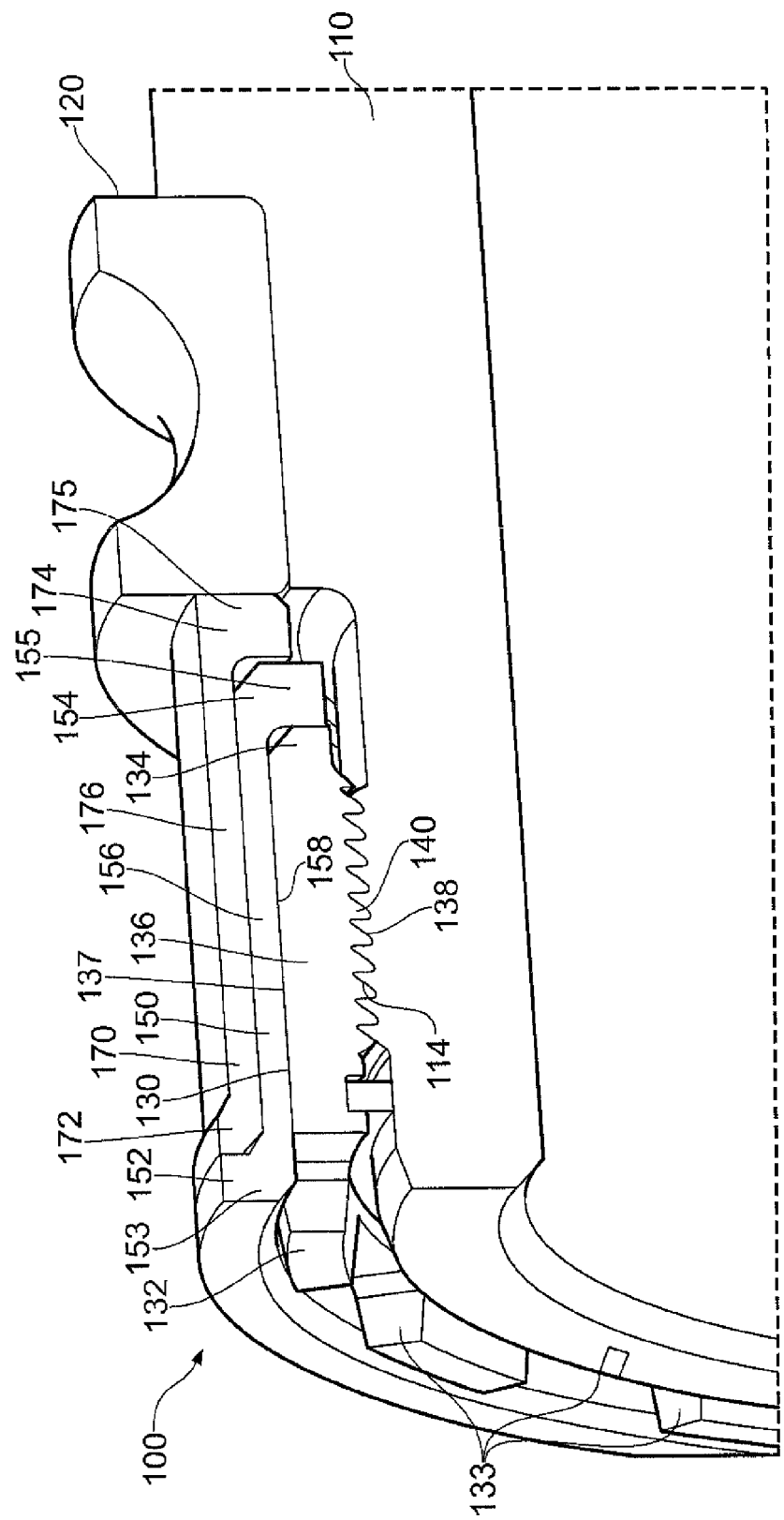
FIG. 3 shows a partial perspective sectional view of the shaft clamp assembly of FIG. 2.

Referring to FIGS. 2 and 3, a shaft clamp assembly according to a first embodiment of the invention is designated generally by the reference numeral 100. The shaft clamp assembly 100 is used in conjunction with a shaft 110 and acts to clamp an object 120 onto the shaft 110.

The shaft clamp assembly 100 comprises a first member 130, a second member 150 and a third member 170. Each of the first member 130, the second member 150 and the third member 170 are formed as hollow cylindrical forms.

In the present embodiment each of the first member 130, the second member 150 and the third member 170 are formed from a high carbon steel material. In other embodiments any one or more of these component parts may be formed from an alternative metal or metal alloy material.

The first member 130 has a first end 132, an opposite second end 134 and an annular body 136 extending between the first end 132 and the second end 134. Additionally, the first member 130 has a threaded portion 140 on a radially inner surface 138 of the annular body 136.

The second member 150 has a first end 152, an opposite second end 154 and an annular body 156 extending between the first end 152 and the second end 154. The first end 152 of the second member 150 has a radially outwardly extending flange 153. The second end 154 of the second member 150 has a radially inwardly extending flange 155.

The third member 170 has a first end 172, an opposite second end 174 and an annular body 176 extending between the first end 172 and the second end 174. The second end 174 of the third member 170 has a radially inwardly extending flange 175.

The annular body 136 of the first member 130 is sized to be a close fit within the annular body 156 of the second member 150 that in turn is sized to be a close fit within the annular body 176 of the third member 170. In this way, the first member 130, the second member 150 and the third member 170 are disposed concentrically in sequence.

The threaded portion 140 of the first member 130 threadingly engages with a corresponding threaded surface 114 of the shaft 110.

In use, the object 120 is positioned onto the shaft 110. In the embodiment shown in FIGS. 2 and 3 the object 120 is a bearing race and it is positioned against a shoulder on the shaft 110. In other arrangements, the object 120 may be any other component that is required to be mounted on a shaft.

The third member 170 is then positioned over the shaft 110 such that the radially inwardly extending flange 175 at the second end 174 of the third member 170 abuts against the object 120.

The second member 150 is then positioned over the shaft 110 and accommodated concentrically within the third member 170 such that the radially outwardly extending flange 153 at the first end 152 of the second member 150 abuts against the first end 172 of the third member 170.

The first member 130 is then positioned over the shaft 110 and accommodated concentrically within the second member 150. The threaded portion 140 of the first member 130 is threadingly engaged with the threaded surface 114 of the shaft 110 such that the second end 134 of the first member 130 abuts against the radially inwardly extending flange 155 of the second member 150.

The first member 130 is then tightened onto the shaft 110 to securely clamp the object 120 onto the shaft 110. The load path comprises the first member 130, the second member 150, the third member 170 and is reacted against the object 120.

Figure 4:
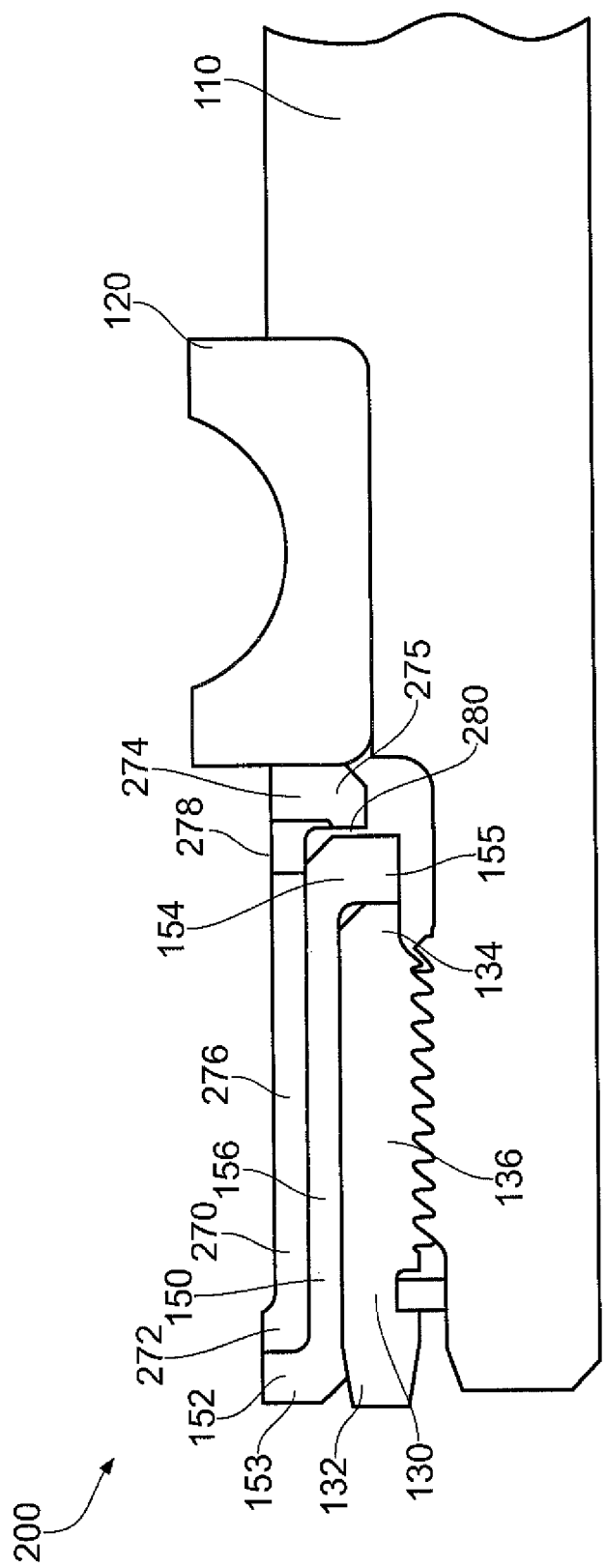
FIG. 4 shows a partial sectional view of a shaft clamp assembly according to a second embodiment of the invention.

Referring to FIG. 4, a shaft clamp assembly according to a second embodiment of the invention is designated generally by the reference numeral 200. Features of the shaft clamp assembly 200 which correspond to those of the shaft clamp assembly 100 have been given corresponding reference numerals for ease of reference.

The shaft clamp assembly 200 comprises a first member 130, a second member 150 and a third member 270.

The third member 270 is formed from a high carbon steel material. In other embodiments the third member 270 may be formed from an alternative metal or metal alloy material.

The third member 270 has a first end 272, an opposite second end 274 and an annular body 276 extending between the first end 272 and the second end 274. The second end 274 of the third member 270 has a radially inwardly extending flange 275.

The shaft clamp assembly 200 has an aperture 278 extending through the annular body 276 of the third member 270 adjacent to the second end 274 of the third member 270.

The aperture 278 extends circumferentially around a part of the annular body 276 of the third member 270.

The aperture 278 is positioned to be radially outward of the second end 154 of the second member 150 such that the gap 280 between the radially inwardly extending flange 155 at the second end 154 of the second member 150 and the radially inwardly extending flange 175 at the second end 174 of the third member 170 is accessible through the aperture 178.

As the first member 130 is tightened onto the shaft 110 the gap 280 will get smaller in direct relation to the level of the clamping force developed in the shaft clamp assembly 200. Consequently by measuring the size of the gap 280 it is possible to ensure that the first member 130 is tightened such that a predetermined clamping force is developed in the shaft clamp assembly 200.

Figure 5:
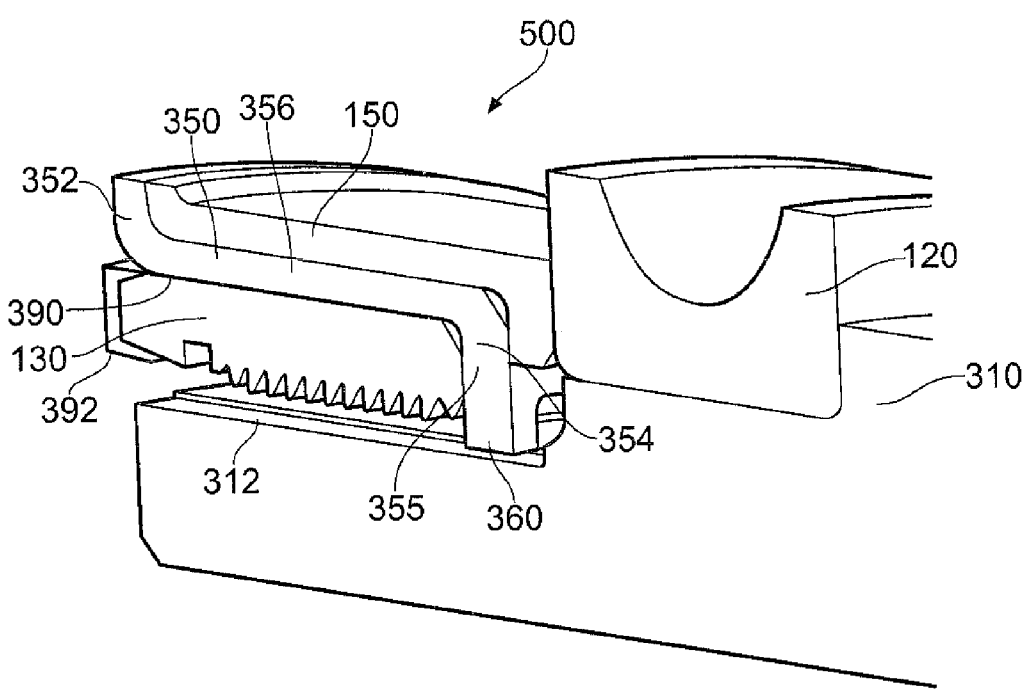
FIG. 5 shows a partial perspective sectional view of a shaft clamp assembly according to a third embodiment of the invention.

Referring to FIG. 5, a shaft clamp assembly according to a third embodiment of the invention is designated generally by the reference numeral 300. Features of the shaft clamp assembly 300 which correspond to those of the shaft clamp assembly 100 have been given corresponding reference numerals for ease of reference. The shaft clamp assembly 300 is used in conjunction with a shaft 310 and acts to clamp an object 120 onto the shaft 310.

The shaft clamp assembly 300 comprises a first member 130, a second member 350, a third member 170, and a deformable annular sleeve 390.

The second member 350 is formed from a high carbon steel material. In other embodiments the second member 350 may be formed from an alternative metal or metal alloy material.

The deformable annular sleeve 390 is formed from thin sheet metal and is positioned radially between first member and the second member. The annular sleeve 390 comprises a first end 392.

The second member 350 has a first end 352, an opposite second end 354 and an annular body 356 extending between the first end 352 and the second end 354. The first end 352 of the second member 350 has a radially outwardly extending flange 353. The second end 354 of the second member 350 has a radially inwardly extending flange 355.

The second end 350 of the second member 350 further comprises a lug 360 extending further radially inwardly of the flange 355. The lug 360 extends radially inwardly into and is accommodated within an axial slot 312 in the shaft 310.

The procedure for assembling the shaft clamp assembly 300 onto the shaft 310 follows that described above in respect of the first embodiment of the invention with the following differences.

When positioning the second member 350 over the shaft 310 it is necessary to align the lug 360 with the axial slot 312 in the shaft 310. The second member 350 is then accommodated concentrically within the third member 170 such that the radially outwardly extending flange 353 at the first end 352 of the second member 350 abuts against the first end 172 of the third member 170.

The deformable annular sleeve 390 is then positioned over the shaft 310 and accommodated concentrically within the second member 350. The first end 392 of the annular sleeve 390 is then plastically deformed radially inwardly to engage with the first end 132 of the first member 130.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

The invention claimed is:

1. A shaft clamp assembly for clamping an object onto a shaft, the shaft clamp assembly comprising:
   a first member formed from a first material, the first member having a first end, an opposite second end, and an annular body extending between the first end and the second end, the annular body having a threaded portion on a radially inner surface thereof;
   a second member formed from a second material, the second member having a first end, an opposite second end, and an annular body extending between the first end of the second member and the second end of the second member, the first end of the second member comprising a radially outwardly extending flange, the second end of the second member comprising a radially inwardly extending flange; and a third member formed from a third material, the third member having a first end, an opposite second end, and an annular body extending between the first end of the third member and the second end of the third member, the second end of the third member comprising a radially inwardly extending flange;

wherein, in use, the first member, the second member, and the third member are disposed concentrically in sequence, the threaded portion of the first member is threadingly engaged with a corresponding threaded surface on the shaft, the second end of the first member presses against the radially inwardly extending flange at the second end of the second member, the radially outwardly extending flange at the first end of the second member presses against the first end of the third member and the radially inwardly extending flange at the second end of the third member presses against the object to thereby secure the object to the shaft.

2. The shaft clamp assembly as claimed in claim 1, wherein the annular body of the third member comprises an aperture adjacent to the second end of the third member, the aperture extending circumferentially around a part of the annular body.

3. The shaft clamp assembly as claimed in claim 1, wherein the second material has a greater coefficient of thermal expansion than the first material.

4. The shaft clamp assembly as claimed in claim 1, wherein the second material has a smaller coefficient of thermal expansion than the first material.

5. The shaft clamp assembly as claimed in claim 1, wherein the third material has a greater coefficient of thermal expansion than the first material.

6. The shaft clamp assembly as claimed in claim 1, wherein the third material has a smaller coefficient of thermal expansion than the first material.

7. The shaft clamp assembly as claimed in claim 1, the second end of the second member comprising a lug, the lug extending radially inwardly of the radially inwardly extending flange at the second end of the second member,
wherein, in use, the lug is accommodated within a corresponding axial slot in the shaft.

8. The shaft clamp assembly as claimed in claim 7, further comprising a deformable annular sleeve, the sleeve being accommodated between a radially outer surface of the annular body of the first member and a corresponding radially inner surface of the annular body of the second member, and the first end of the first member comprises an annular array of castellations,
wherein, in use, a first end of the sleeve is engageable with the castellations at the first end of the first member, and an opposite second end of the sleeve is engageable with the axial slot in the shaft, to prevent rotation of shaft clamp relative to the shaft.

9. The shaft clamp assembly as claimed in claim 1, wherein the second material has a greater modulus of elasticity than the first material.

10. The shaft clamp assembly as claimed in claim 1, wherein the second material has a smaller modulus of elasticity than the first material.

11. The shaft clamp assembly as claimed in claim 1, wherein the third material has a greater modulus of elasticity than the first material.

12. The shaft clamp assembly as claimed in claim 1, wherein the third material has a smaller modulus of elasticity than the first material.

13. A method of clamping an object onto a shaft using a shaft clamp assembly, the method comprising the steps of:
providing a shaft clamp assembly comprising:
a first member formed from a first material, the first member having a first end, an opposite second end, and an annular body extending between the first end and the second end, the annular body having a threaded portion on a radially inner surface thereof;
a second member formed from a second material, the second member having a first end, an opposite second end, and an annular body extending between the first end of the second member and the second end of the second member, the first end of the second member comprising a radially outwardly extending flange, the second end of the second member comprising a radially inwardly extending flange; and
a third member formed from a third material, the third member having a first end, an opposite second end, and an annular body extending between the first end of the third member and the second end of the third member, the second end of the third member comprising a radially inwardly extending flange;
positioning the object on the shaft;
positioning the third member on the shaft with the radially inwardly extending flange at the second end of the third member abutting the object;
positioning the second member on the shaft and concentrically within the third member with the radially outwardly extending flange at the first end of the second member abutting the first end of the third member;
positioning the first member on the shaft and concentrically within the second member, and threadingly engaging the threaded portion of the first member with the threaded surface of the shaft such that the second end of the first member abuts against the radially inwardly extending flange at the second end of the second member; and
tightening the first member onto the shaft to clamp the object onto the shaft, such that the first member, the second member, and the third member are disposed concentrically in sequence, the threaded portion of the first member is threadingly engaged with a corresponding threaded surface on the shaft, the second end of the first member presses against the radially inwardly extending flange at the second end of the second member, the radially outwardly extending flange at the first end of the second member presses against the first end of the third member and the radially inwardly extending flange at the second end of the third member presses against the object to thereby secure the object to the shaft.

14. The method as claimed in claim 13, wherein the annular body of the third member comprises an aperture adjacent to the second end of the third member, the aperture extending circumferentially around part of the annular body, the step of tightening the first member onto the shaft to clamp the object onto the shaft comprises the step of:
measuring a clearance between the second end of the second member and the second end of the third member through the aperture; and
tightening the first member onto the shaft until the clearance is within a predetermined range, to clamp the object onto the shaft with a corresponding predetermined torque.

* * * * *